Patented Aug. 7, 1928.

1,679,664

UNITED STATES PATENT OFFICE.

HANS JORDAN, OF BERLIN-STEGLITZ, GERMANY, ASSIGNOR TO THE FIRM: CHEMISCHE FABRIK AUF ACTIEN VORM. E. SCHERING, OF BERLIN, GERMANY.

ALKYL CUMARANES AND PROCESS OF MAKING SAME.

No Drawing. Application filed June 20, 1927, Serial No. 200,291, and in Germany June 29, 1926.

My invention refers to chemical products having valuable properties more especially as solvents for lacquers and the like and as starting materials for the manufacture of thymol and menthol. The new products are obtained by decomposition of those products which result in the condensation, effected at temperatures below 100° C. in the pressure of condensing agents such as hydrochloric acid, between alkyl phenols and ketones described in my copending application for patent of the United States Serial No. 200,289 filed of even date herewith and entitled "Chemical product and process of making same". These products of condensation contain acylizable hydroxyl groups and probably have the constitution shown for the product from m-cresol and acetone by the following formula

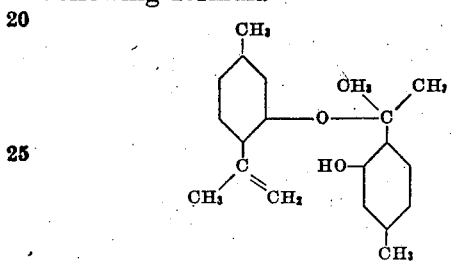

I have now ascertained that if these products of condensation are heated to about 300° C., the components distil over in a quantitative manner and can be separated by fractional distillation. I prefer expediting the distilling of the components from the material heated to about 300° C. by slight evacuation, the degree of evacuation being chosen in such manner that the original product does not distil over. The components being alkyl isopropylene phenols and cumaranes, can be separated from each other by fractional distillation and the cumaranes can be collected.

Example 1.

The product of condensation from m-cresol and acetone described in my copending application above mentioned, if heated to about 300° C., is decomposed into its constituents, which distil over. Preferably distillation is expedited by evacuation. On subjecting the distillate to fractionation there is obtained, besides 3-methyl-6-isopropylene phenol, the dimethyl cumarane which boils under 11 mms. mercury pressure at 98° C. It has the formula

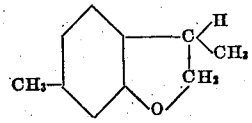

Example 2.

The product of condensation from p-cresol and acetone described in my copending application for patent aforementioned is heated to 300–310° C. and treated further as described with reference to Example 1. By subjecting the distillate to fractionation there is obtained besides 4-methyl-6-isopropylene phenol the dimethyl cumarane boiling under 11 mms. mercury pressure at 102° C. and having the formula

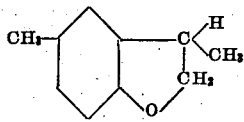

Example 3.

The product of condensation from crude cresol, being a mixture from m- and p-cresol and acetone, described in my above mentioned copending application is heated to about 300–310° C., when its constituents will distil over and can be separated by fractional distillation, resulting in the recovery, besides of a mixture of 3- and 4-methyl-6-isopropylen phenol, of the two cumaranes described with reference to Examples 1 and 2.

Various changes may be made in the details disclosed in the foregoing specification without departing from the invention or sacrificing the advantages thereof.

I claim:—

1. The process of producing alkyl cumaranes comprising heating products of condensation of alkyl phenols and a ketone to about 300–310° C. to effect decomposition, subjecting the products of decomposition to fractional distillation, and collecting the alkyl cumaranes.

2. The process of producing alkyl cumaranes comprising heating products of condensation of a methyl phenol and acetone to about 300–310° C. to effect decomposition, subjecting the products of decomposition to fractional distillation and collecting the methyl cumarane.

3. The process of producing alkyl cumaranes comprising heating products of condensation of alkyl phenols and a ketone to about 300–310° C. to effect decomposition in vacuo, subjecting the products of decomposition to fractional distillation, and collecting the alkyl cumaranes.

4. The process of producing alkyl cumaranes comprising heating products of condensation of crude cresol and acetone to about 300–310° C. to effect decomposition, subjecting the products of decomposition to fractional distillation and collecting the dimethyl cumarane.

In testimony whereof I affix my signature.

HANS JORDAN.